(12) United States Patent
Keskin et al.

(10) Patent No.: US 11,272,816 B2
(45) Date of Patent: Mar. 15, 2022

(54) MULTI-FITMENT PAPER TOWEL ROLL HOLDER

(71) Applicant: B/E Aerospace, Inc., Winston-Salem, NC (US)

(72) Inventors: Volkan Keskin, Enfield (GB); Vincent M. O. Lajux, Milton Keynes (GB); Barry R. Green, Lytham St. Anne's (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 59 days.

(21) Appl. No.: 16/715,985

(22) Filed: Dec. 16, 2019

(65) Prior Publication Data

US 2021/0059485 A1 Mar. 4, 2021

Related U.S. Application Data

(60) Provisional application No. 62/893,905, filed on Aug. 30, 2019.

(51) Int. Cl.
*A47K 10/22* (2006.01)
*B64D 11/02* (2006.01)
*B64D 11/04* (2006.01)

(52) U.S. Cl.
CPC .............. *A47K 10/22* (2013.01); *B64D 11/02* (2013.01); *B64D 11/04* (2013.01)

(58) Field of Classification Search
None
See application file for complete search history.

(56) References Cited

U.S. PATENT DOCUMENTS

| | | | | |
|---|---|---|---|---|
| 1,702,971 A | | 2/1929 | Walton | |
| 3,088,686 A | * | 5/1963 | Curry | A47K 10/40 242/596.1 |
| 4,097,002 A | * | 6/1978 | Krueger | A47K 10/40 242/160.1 |
| 4,105,168 A | * | 8/1978 | Rutherford | A47K 10/40 242/596.1 |
| 4,771,966 A | * | 9/1988 | Anderson | A47K 10/40 225/51 |
| 5,444,899 A | * | 8/1995 | Koppelomaki | A44B 11/25 24/615 |

(Continued)

FOREIGN PATENT DOCUMENTS

EP 3785589 A1 3/2021

OTHER PUBLICATIONS

Search Report for European Application No. 20195794.1 dated Mar. 3, 2021, 3 pages.

*Primary Examiner* — William A. Rivera
(74) *Attorney, Agent, or Firm* — Suiter Swantz pc llo

(57) ABSTRACT

A paper towel roll holder attachable to a galley wall or interior surface of a vehicle is disclosed. The paper towel roll holder includes a fixed carrier section mountable to the wall and terminating in a fixed support arm extending therefrom, the support arm including a circular or rounded boss capable of fitting into an inner cardboard sleeve of a paper towel roll of variable length. The paper towel roll holder includes a sleeve section terminating in an opposing support arm also including a rounded boss capable of fitting the inner sleeve. The sleeve section slides along the fixed carrier section to accommodate paper towel rolls of varying lengths.

7 Claims, 11 Drawing Sheets

(56) References Cited

U.S. PATENT DOCUMENTS

| | | | | |
|---|---|---|---|---|
| 5,662,288 | A | * | 9/1997 | Chiang .................. A47K 10/38 242/596 |
| 5,950,961 | A | * | 9/1999 | Duck ..................... A47K 10/40 242/596.1 |
| 6,402,085 | B1 | * | 6/2002 | Smith .................... A47K 10/40 242/578 |
| 6,446,927 | B1 | * | 9/2002 | Nuss ...................... A47K 10/38 211/16 |
| 6,755,382 | B1 | * | 6/2004 | Melnick ................ A47K 10/38 242/596.1 |
| 6,761,298 | B1 | * | 7/2004 | Cantrell ............... B65H 35/002 225/42 |
| 2007/0158489 | A1 | * | 7/2007 | Anderson .............. A47K 10/40 242/596.4 |

* cited by examiner

MULTI-FITMENT PAPER TOWEL ROLL HOLDER

CROSS-REFERENCE TO RELATED APPLICATIONS

The instant application claims priority under 35 U.S.C. § 119 to U.S. provisional patent application Ser. No. 62/893,905 filed Aug. 30, 2019. Said provisional patent application Ser. No. 62/893,905 is herein incorporated by reference in its entirety.

TECHNICAL FIELD

Embodiments of the subject matter disclosed herein are directed generally to aircraft interior fixtures, and more particularly to mechanisms for retaining and dispensing paper towels in galley or lavatory environments.

BACKGROUND

Catering services aboard commercial aircraft galleys may encounter liquid spillages or unwanted food residue requiring removal. Airlines may provide disposable paper towel rolls for this purpose. However, various local suppliers around the world may provide differently sourced rolls, which may vary widely with respect to the roll length or diameter of the inner cardboard sleeve. As a result, some roll sizes may not be compatible with standard paper roll holders.

SUMMARY

A paper towel roll holder (e.g., for an aircraft galley or lavatory) is disclosed. In embodiments, the roll holder has a carrier section mountable to a wall or bulkhead and a support arm extending (e.g., orthogonally) from the carrier section and terminating in a rounded boss compatible with an inner sleeve of a paper towel roll. A sleeve section is slidably attached to the carrier section to accommodate rolls of various widths, the sleeve section also having a support arm extending orthogonally therefrom and terminating in a rounded boss.

A paper towel roll holder (e.g., for an aircraft galley or lavatory) is also disclosed.

In embodiments, the roll holder includes a rectangular body mountable to a wall or bulkhead, a pair of support arms extending from the body in opposing directions and terminating in a pair of roll locators rotatably attached to the support arms, the roll locators compatible with either side of an inner sleeve of a paper towel roll. The body includes a tension spring disposed within and configured for securing the roll between the roll locators by drawing the support arms, and thus the roll locators, toward each other.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
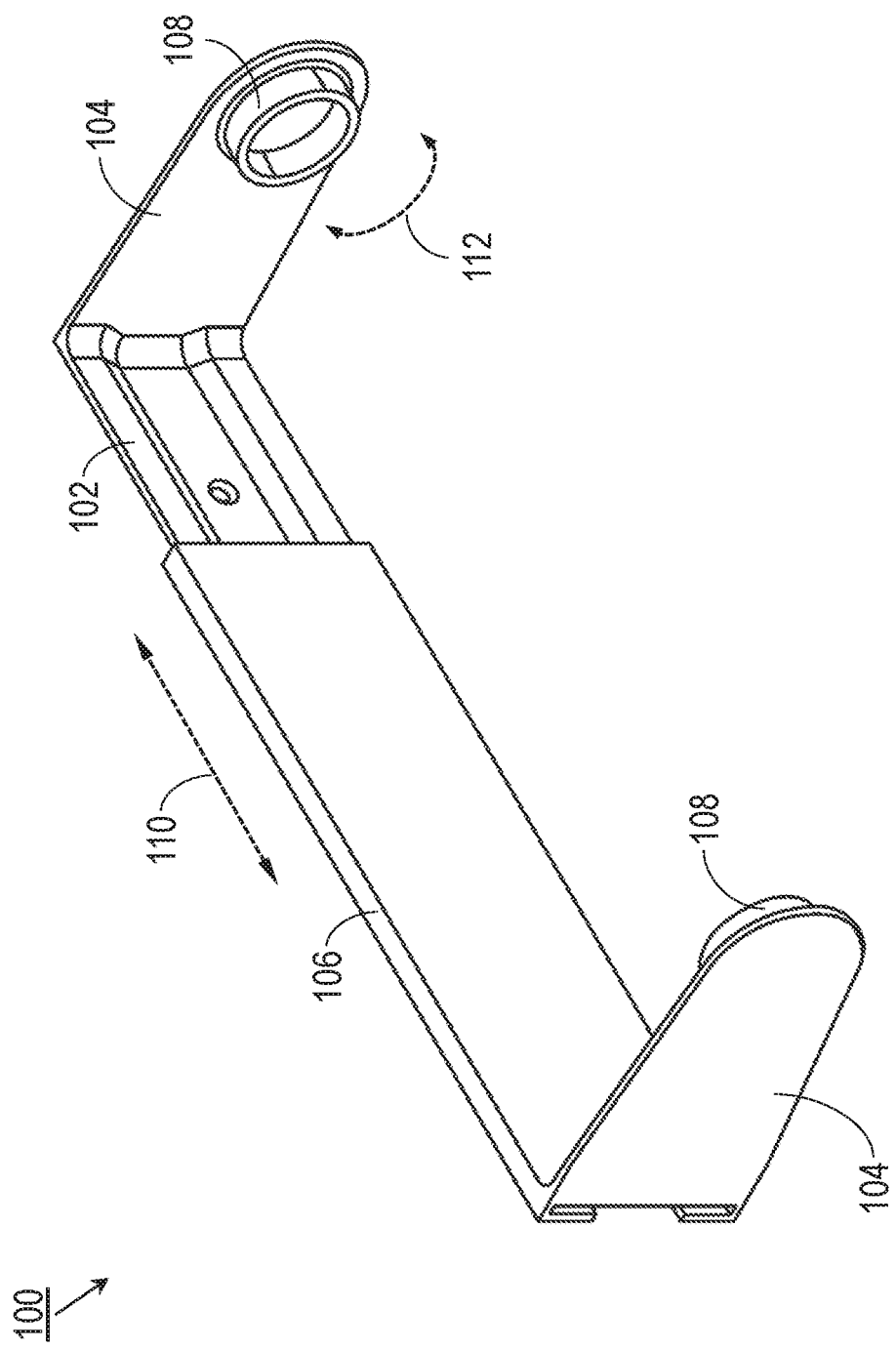
FIG. 1 is a forward isometric view illustrating a paper towel roll holder in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a paper towel roll holder 100 is disclosed. The paper towel roll holder 100 may be capable of providing a range of adjustment of its length in order to accommodate a range of dimensionally different paper towel rolls (e.g., rolls of different longitudinal lengths, rolls of different diameters or having inner sleeves of different widths). The paper towel roll holder 100 may incorporate a fixed carrier section 102 terminating in a support arm 104 and a sliding sleeve section 106 (also terminating in a support arm 104), each support arm having a rounded (e.g., substantially circular) boss 108.

In embodiments, the carrier section 102 may be mounted (e.g., bolted, screwed, or otherwise attached) to a galley wall or other interior surface (1002, FIG. 10) of an aircraft or other vehicle. The carrier section 102 and sleeve section 106 may be fashioned of injection molded plastic, fabricated (e.g., extruded, stamped) metal, or any other appropriate material. The support arms 104 may project from the carrier section 102 and sleeve section 106 at substantially right angles, or at any other angle enabling the rounded bosses 108 to fit within the opposing cylindrical inner sleeves of a paper towel roll. The support arms 104 may be of a single piece respectively with the carrier section 102 and sleeve section 106, or attached to the carrier section and sleeve section as described below.

In embodiments, the sleeve section 106 may slide laterally (110) along or over the carrier section 102 to increase or decrease the overall length of the paper towel roll holder 100, such that the length may be increased to accommodate a paper towel roll of given length and decreased such that the rounded bosses 108 may be secured in either end of the inner sleeve of the paper towel roll to hold the roll in place. In some embodiments, the rounded bosses 108 may be capable of rotation (112) relative to the support arms 104 to facilitate use of the paper towel roll.

Figure 2:
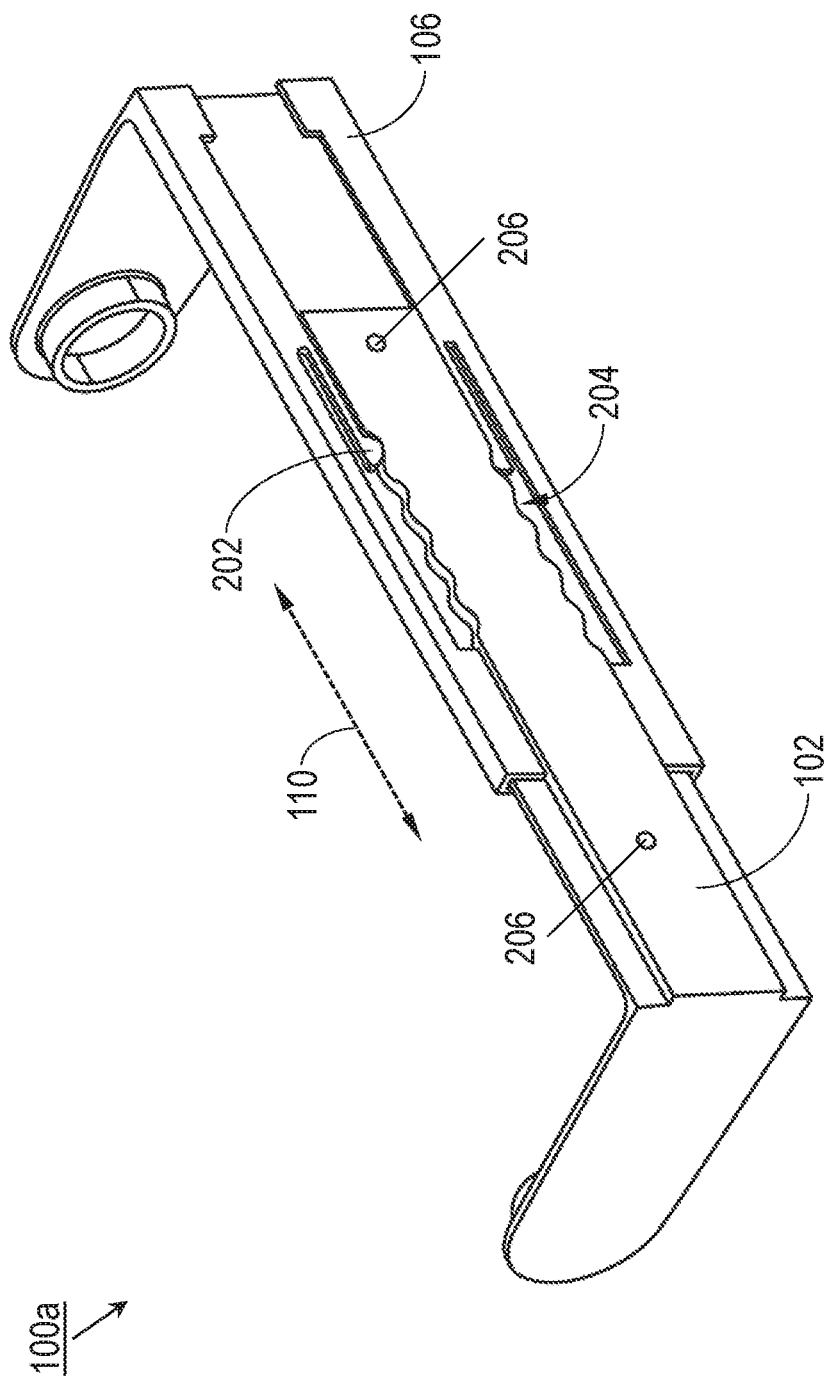
FIG. 2 is a reverse isometric view illustrating the paper towel roll holder of FIG. 1.

Referring now to FIG. 2, the paper towel roll holder 100a may be implemented and may function similarly to the paper towel roll holder 100 of FIG. 1, except that the paper towel roll holder 100a may incorporate locking tabs 202 and detents 204 to secure the paper towel roll holder at a variety of desired lengths.

In embodiments, the paper towel roll holder 100a may be configured to be set at different desired lengths, each desired length corresponding to a particular and known roll length. For example, the locking tabs 202 may be D-tabs fixed to the sleeve section 106 above and below the carrier section 102, the D-tabs capable of a spring effect due to their design. The carrier section 102 may include a series of detents 204 compatible with the locking tabs 202 such that the paper towel roll holder 100a may be set to any desired length by pulling or pushing (110) the sleeve section 106 relative to the carrier section, such that the locking tabs come to rest in the desired set of upper and lower detents until removed by further pulling or pushing.

In embodiments, the carrier section 102 may be attached to a galley wall or interior surface in two locations (e.g., fixing holes) 206 (e.g., via screws, bolts, or other similar fasteners).

Figure 3A:
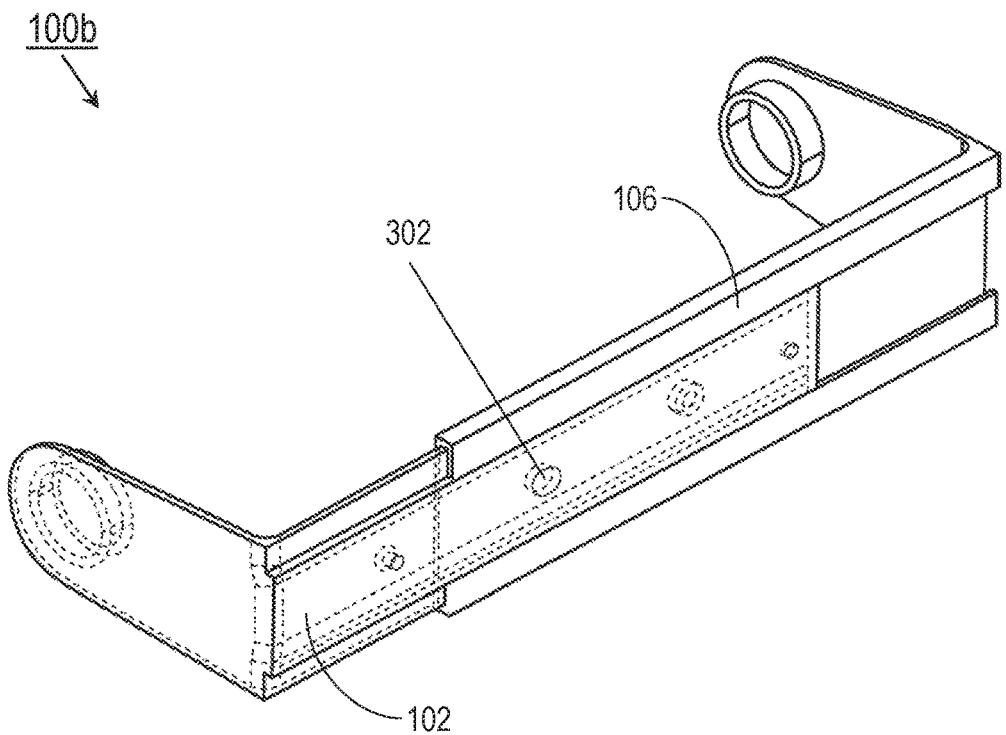
FIG. 3A is a reverse isometric view illustrating the paper towel roll holder of FIG. 1 incorporating an alternative locking mechanism.
Figure 3B:
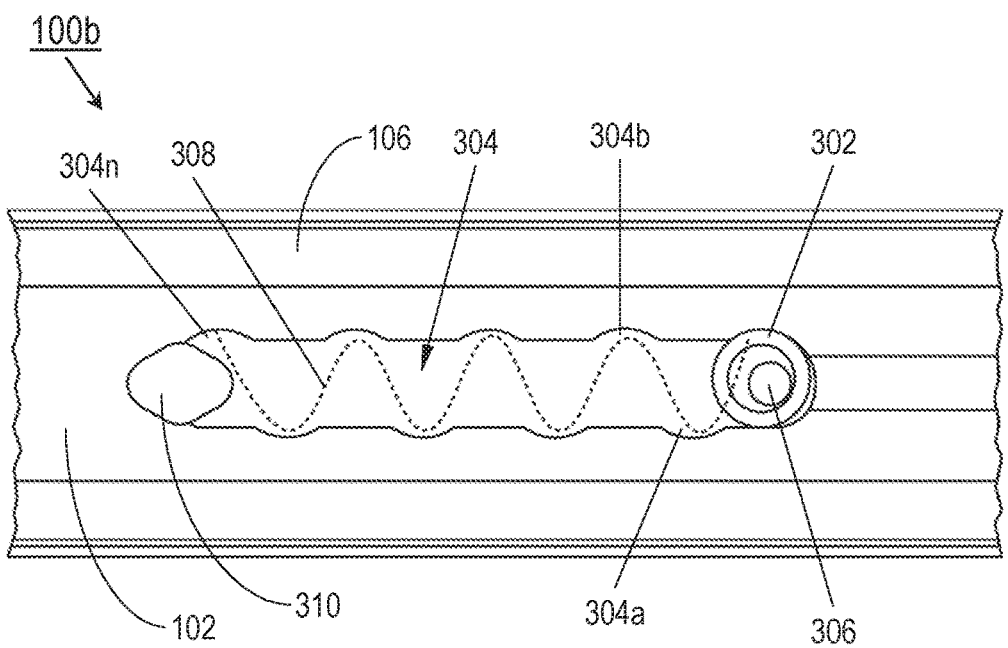
FIGS. 3B and 3C are detailed views illustrating the locking mechanism of FIG. 3A.
Figure 3C:
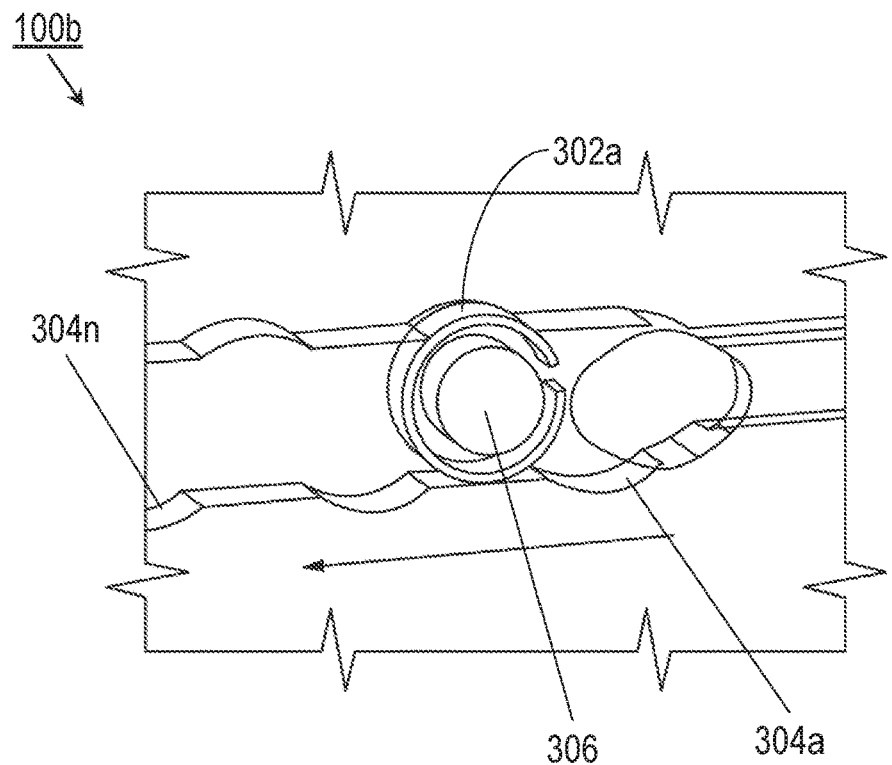

Referring to FIGS. 3A through 3C, the paper towel roll holder 100b may be implemented and may function similarly to the paper towel roll holder 100a of FIG. 2, except that the paper towel roll holder 100b may incorporate a compressible position ring 302 and staggered track 304 to secure the paper towel roll holder at any of a variety of possible desired lengths.

In embodiments, the position ring 302 may be a compressible or deformable rubber or plastic ring retained by a guide pin 306. The guide pin 306 may additionally serve as a spring for positive location of the sleeve section 106 relative to the carrier section 102 via the staggered track 304. For example, the staggered track 304 may comprise a series of staggered detents 304a, 304b, . . . 304n alternating between the top and bottom sides of the track, such that (e.g., compared to the detents 204 shown by FIG. 2) the paper towel roll holder 100b may be capable of more precise adjustment due to the larger number and closer proximity of the staggered detents 304a-n. The position ring 302 may proceed along a stepped path 308 through each successive staggered detent 304a-n, compressing between adjacent staggered detents until the next detent is reached (regulated by the guide pin 306) and increasing or decreasing the length of the paper towel roll holder as desired. In some embodiments, the position ring 302 may be replaced if deformed or worn by use; for example, a replacement position ring may be fitted to the guide pin 306 via an installation aperture 310 set into the carrier section 102.

Referring in particular to FIG. 3C, the paper towel roll holder may incorporate, instead of the position ring 302 of FIG. 3B, a metallic "spring ring" 302a similarly compressed between staggered detents 304a-n until reaching the next detent and locking the paper towel roll holder into a desired length.

Figure 4:
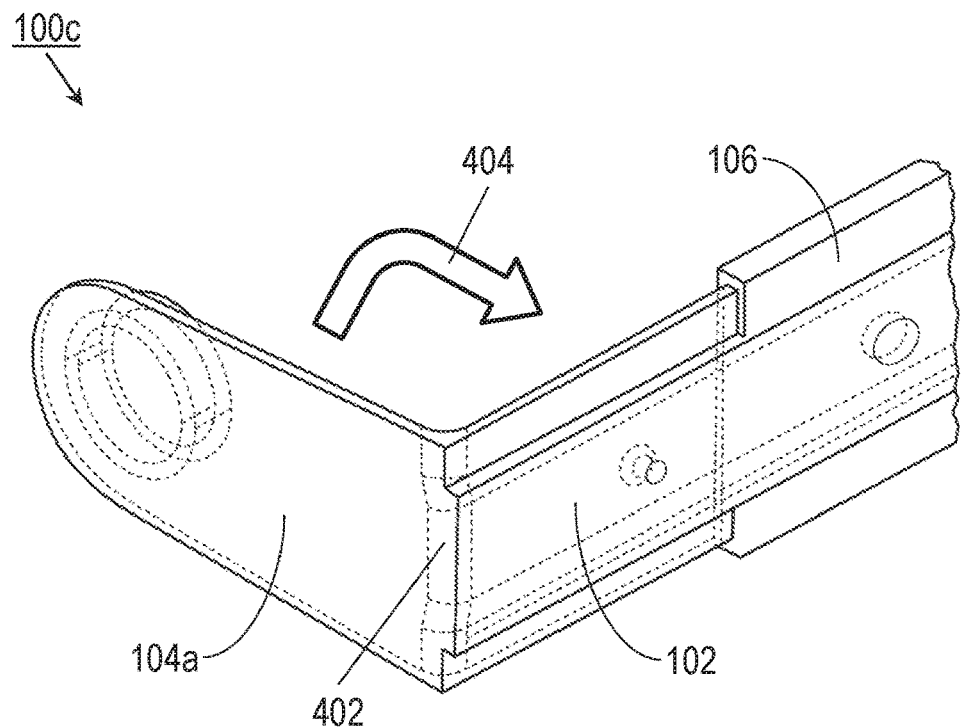
FIG. 4 is a detailed view illustrating the paper towel roll holder of FIG. 1, incorporating an alternative support arm.

Referring to FIG. 4, the paper towel roll holder 100c may be implemented and may function similarly to the paper towel roll holders 100, 100a/b of FIGS. 1 through 3C, except that the paper towel roll holder 100c may incorporate support arms 104a incorporating hinges 402 and capable of folding inwards (404) toward the carrier section 102 or sleeve section 106 when not in use. In some embodiments, the support arms 104a may be retained in the folded position by springs, mechanical catches, magnets, or any other appropriate means of restricting free movement of the support arms when a paper towel roll is not installed therebetween.

Figure 5A:
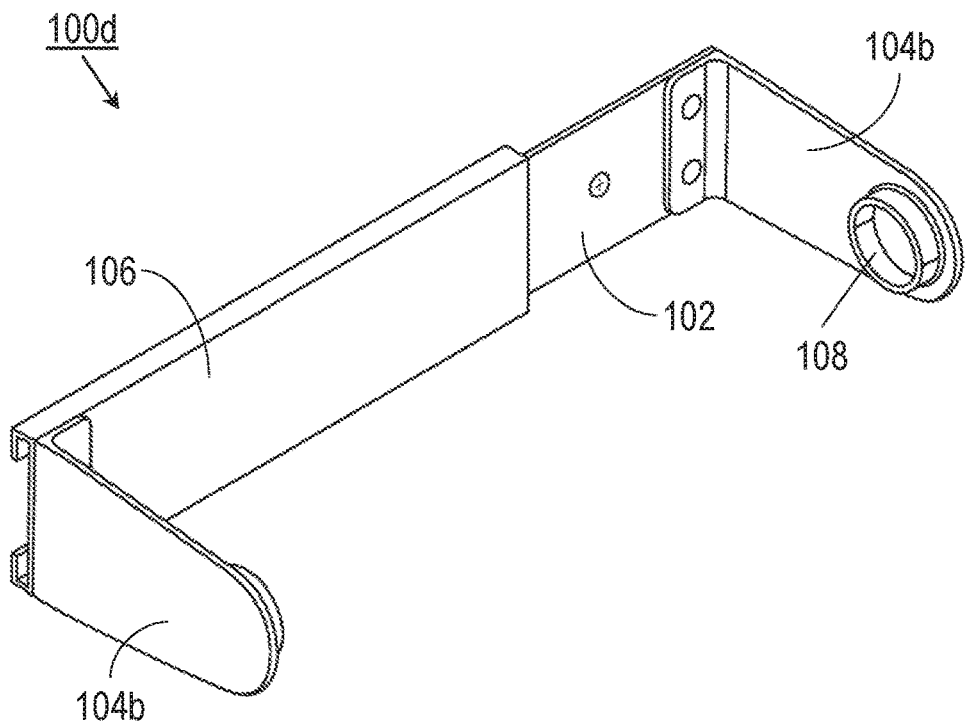
FIGS. 5A and 5B are respectively forward and reverse isometric views illustrating the paper towel roll holder of FIG. 1.
Figure 5B:
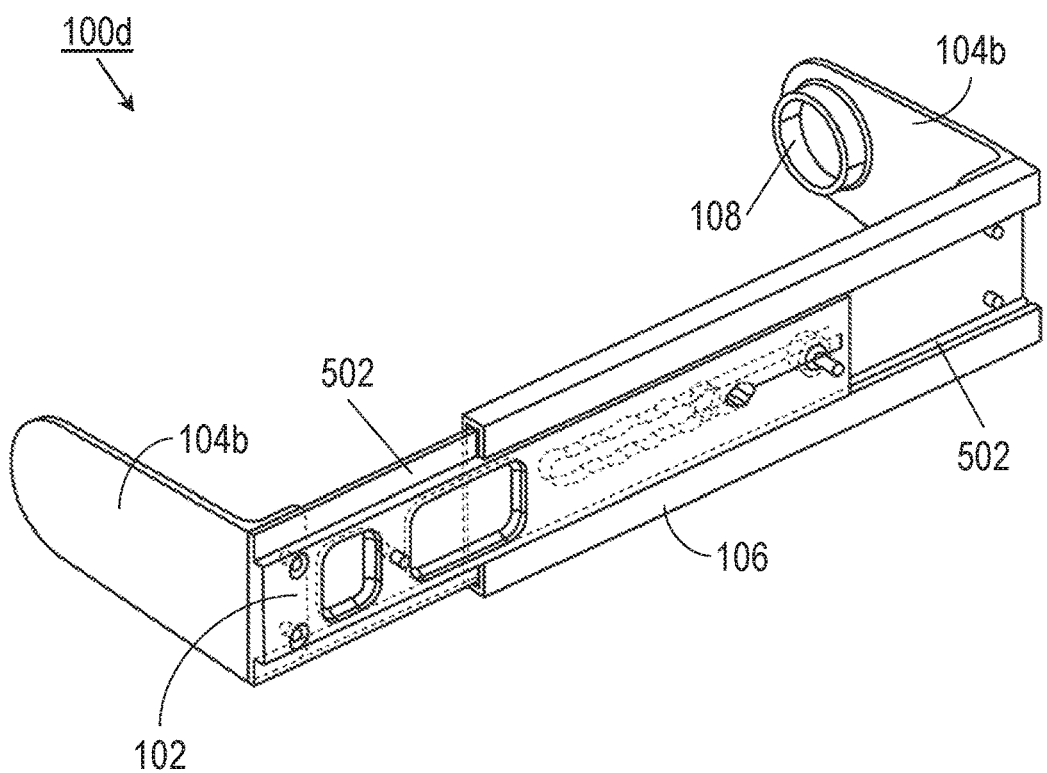

Referring to FIGS. 5A and 5B, the paper towel roll holder 100d may be implemented and may function similarly to the paper towel roll holders 100, 100a-c of FIGS. 1 through 4, except that the paper towel roll holder 100d may be fashioned of fabricated metal comprising extruded, stamped, folded or otherwise machined parts. For example, the paper towel roll holder 100d may incorporate hinged support arms (104a, FIG. 4) or machined support arms 104b (e.g., which may incorporate the rounded bosses 108 in a single piece, or to which the bosses may be welded) attached (e.g., bolted, screwed, fastened) to the carrier section 102 and the sleeve section 106. Friction between the sleeve section 106 and the carrier section 102 may be reduced by the incorporation of slide rails 502 (e.g., fashioned of polytetrafluoroethylene (PTFE) or any similarly appropriate low-friction material) where the sleeve section contacts the carrier section.

Figure 6A:
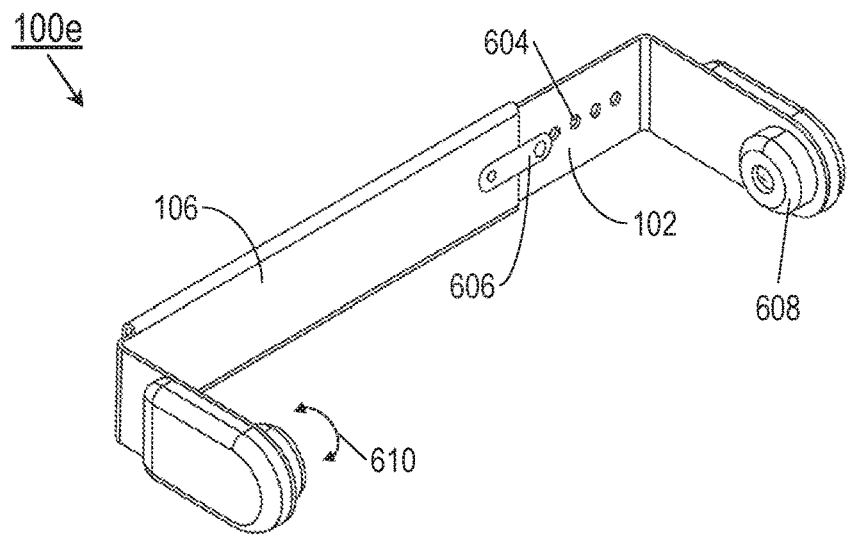
FIGS. 6A through 6C are respectively forward, section plan, and reverse isometric views illustrating the paper towel roll holder of FIG. 1, incorporating an alternative locking mechanism.
Figure 6B:
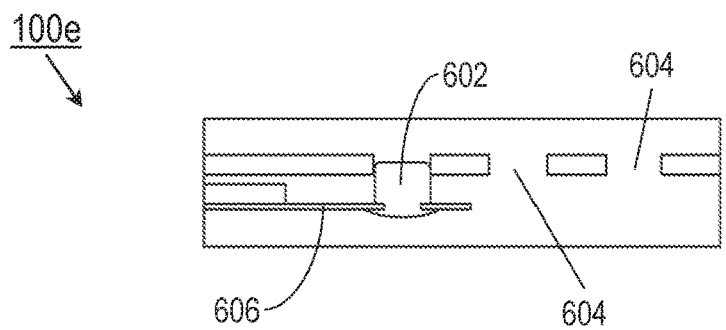

Referring to FIGS. 6A and 6B, the paper towel roll holder 100e may be implemented and may function similarly to the paper towel roll holders 100 (FIG. 1) and 100d (FIGS. 5A/B), except that the paper towel roll holder 100e may incorporate spring steel actuated positioning buttons 602 locatable within a series of holes 604 in the carrier section 102 to adjust the length of the paper towel roll holder. In some embodiments, the carrier section 102 and sleeve section 106 may incorporate (e.g., instead of the rounded bosses 108, FIG. 1) rounded bobbins 608 capable of free rotation (610) once inserted into the inner sleeve of a paper towel roll.

Figure 6C:
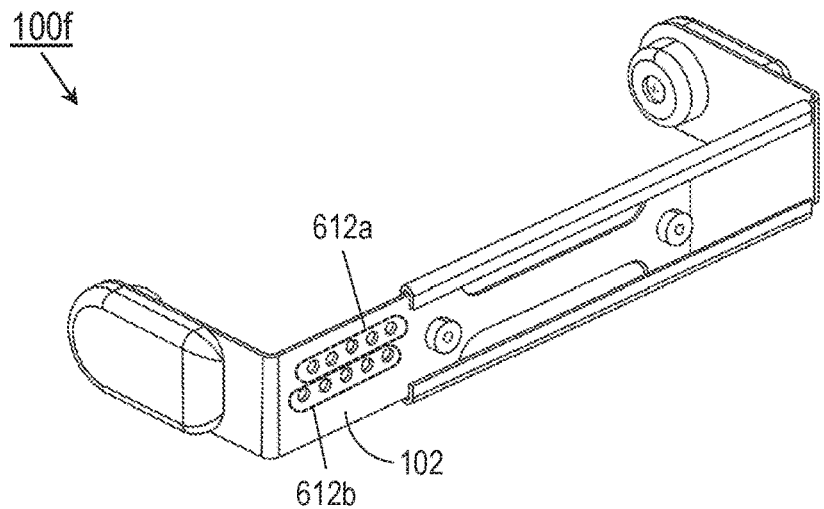

In some embodiments, the paper towel roll holder 100e may incorporate additional rows of parallel holes 604 and corresponding positioning buttons 602 for added stability. Referring to FIG. 6C, the paper towel roll holder 100f may be implemented and may function similarly to the paper towel roll holder 100e of FIGS. 6A/B, except that the paper towel roll holder 100f may incorporate staggered rows of holes (612a-b) set into the carrier section 102 for more precise length adjustment.

Figure 7A:
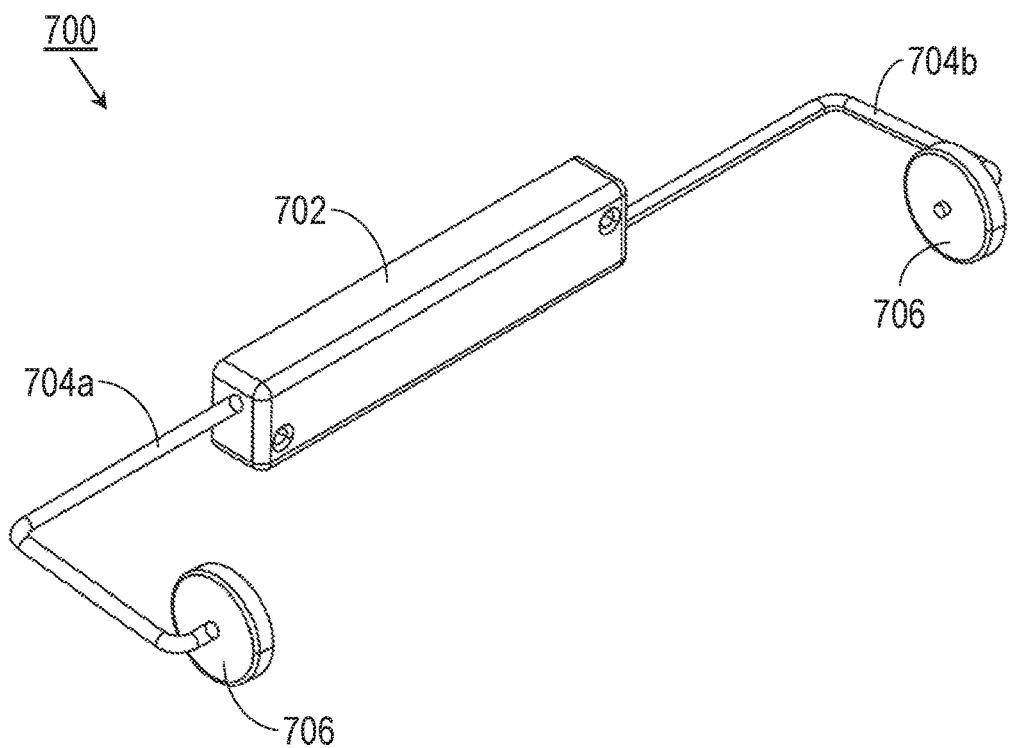
FIGS. 7A and 7B are respectively forward and reverse isometric views illustrating a paper towel roll holder in accordance with example embodiments of this disclosure.
Figure 7B:
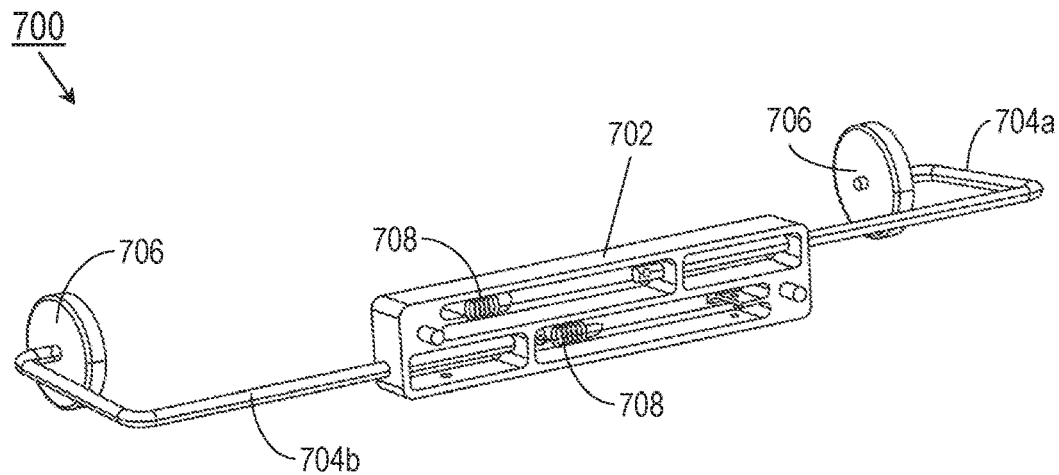

Referring to FIGS. 7A and 7B, a paper towel roll holder 700 is disclosed. The paper towel roll holder 700 may include a substantially rectangular, rounded rectangular, or boxlike body 702 attachable to a galley wall or interior surface and two support arms 704a-b extending from either side of the body (e.g., substantially parallel to the galley wall) and terminating in substantially circular roll locators 706 configured to fit inside the inner sleeve of a paper towel roll and capable of free rotation relative to the support arms.

In embodiments, the support arms 704a-b may be circular, polygonal, tubular, or solid in construction and may be offset or asymmetrical relative to each other. For example, the support arm 704a may extend from the body 702 at a height just above that of the support arm 704b. Referring in particular to FIG. 7B, the support arms 704a-b may be secured to the body 702 by, and the movement of the support arms relative to the body controlled by, tension springs 708. The tension springs 708 may serve to draw the support arms 704a-b toward each other and prevent the roll locators 706 from detaching, allowing the support arms 704a-b to grip and hold any of a variety of lengths of paper towel rolls (e.g., able to fit between the roll locators 706 when the support arms 704a-b are extended).

Referring to FIGS. 8A through 8D, the paper towel roll holder 700a may be implemented and may function similarly to the paper towel roll holder of FIGS. 7A and 78, except that the paper towel roll holder 700a may include, extending from the body 702, a fixed support arm 802 and an extendible support arm 804 (as opposed to, e.g., the two extendible support arms 704a-b of FIGS. 7A-B), both support arms terminating in tapered bobbins 806.

In embodiments, the fixed and extendible support arms 802, 804 may be set on a common plane (as opposed to the offset support arms 704a-b). For example, referring in particular to FIG. 8, the fixed support arm 802 may extend from the body 702 at a fixed length while the extendible support arm 804 may be extended (808) from a minimum distance 808a to a maximum distance 808b (e.g., roll height), from which point tension upon the extendible support arm (maintained by compression springs 810 within the body 702) draws the extendible support arm toward the inner sleeve of the paper towel roll 812, gripping the roll in place and allowing free rotation of the roll via the tapered bobbins 806.

In embodiments, the tapered bobbins 806 may be tapered for greater compatibility with a variety of inner sleeves having a variety of widths. The tapered bobbins may include bushings 814 of nylon or any appropriate low-friction material to enhance the free rotation of the tapered bobbins relative to the fixed and extendible support arms 802, 804 and eliminate metal-to-metal binding between the bobbins and the support arms.

Figure 8A:
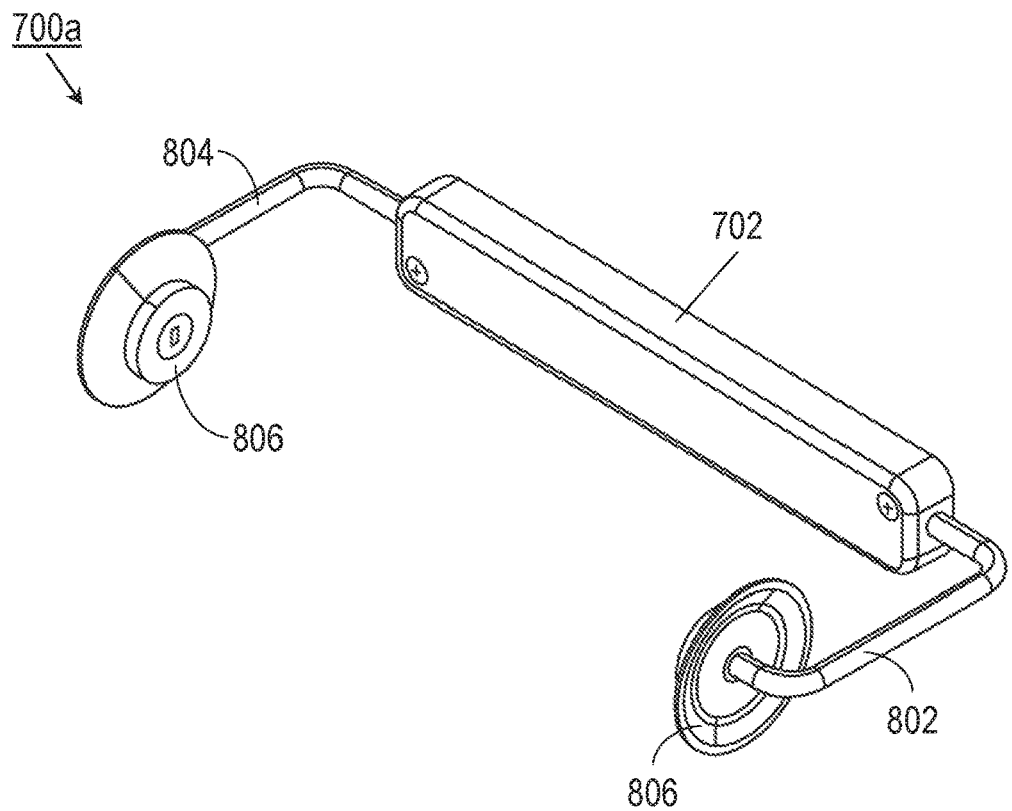
FIG. 8A is a forward isometric view illustrating a paper towel roll holder of FIG. 7A incorporating parallel support arms and a fixed support arm.
Figure 8B:
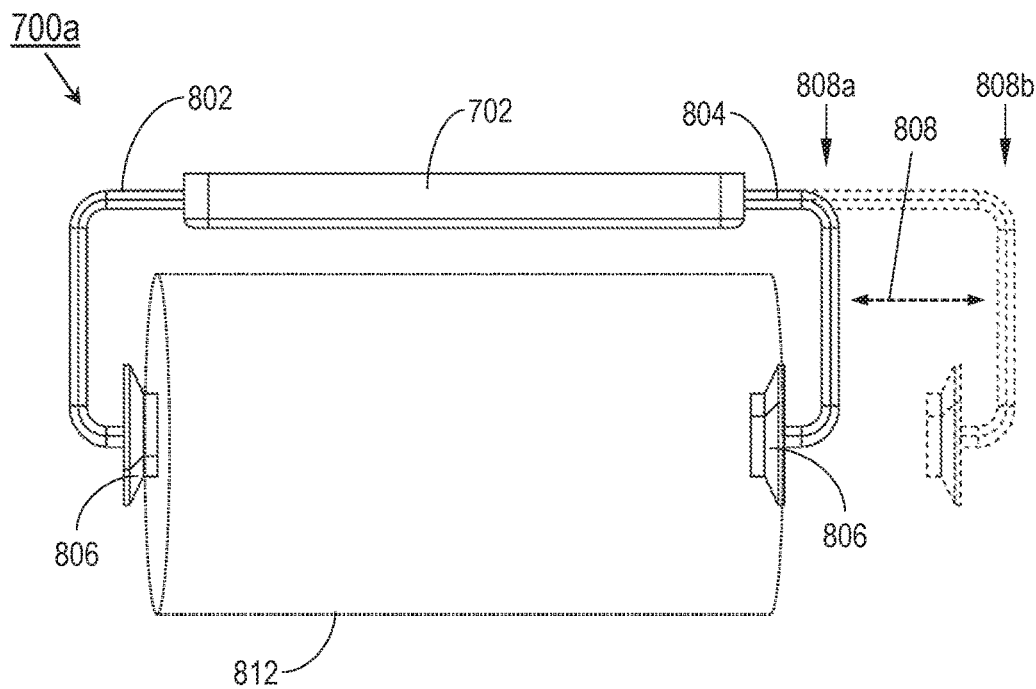
FIG. 8B is an overhead view of the paper towel roll holder of FIG. 8A.
Figure 8C:
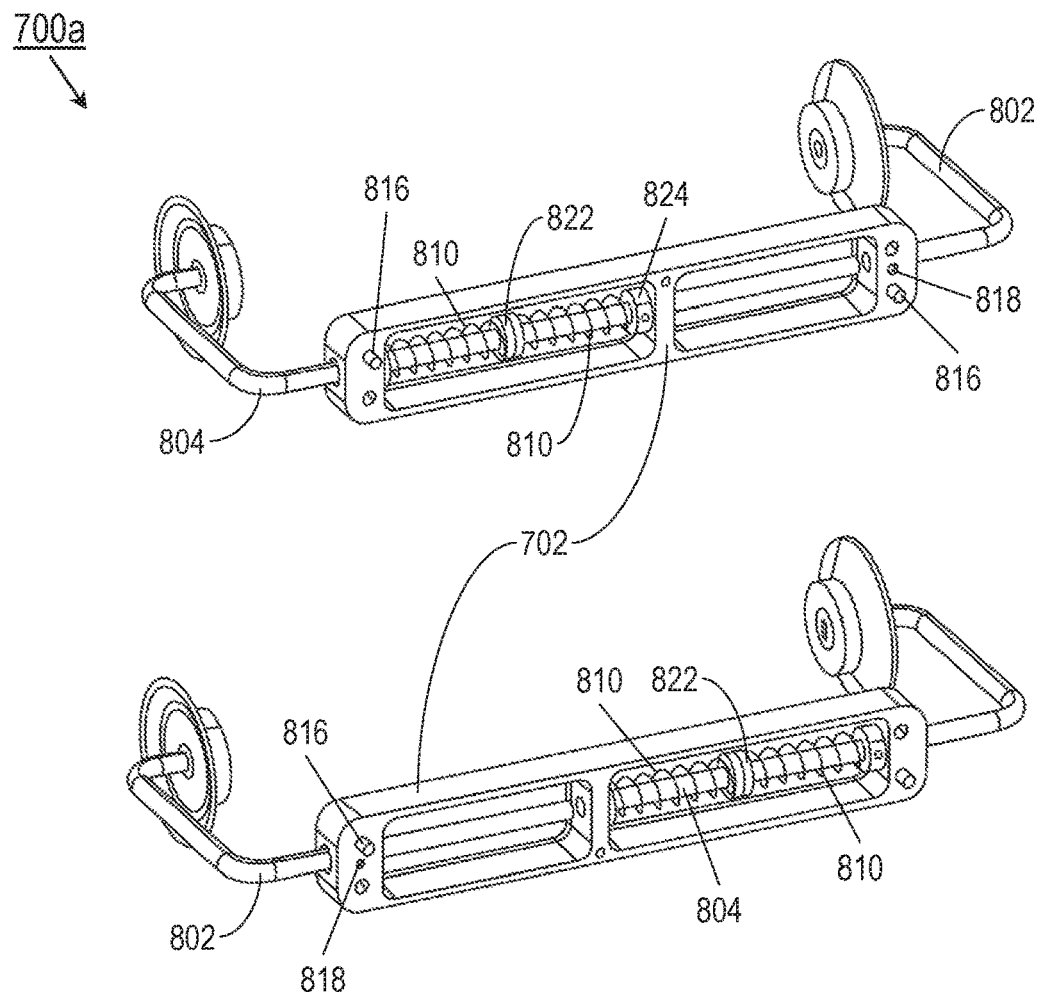
FIG. 8C is a reverse isometric view of the paper towel roll holder of FIG. 8A in multiple installation configurations.

Referring in particular to FIG. 8C, the paper towel roll holder 700a may be mounted to the galley wall or interior surface (e.g., bolted, pinned, screwed, or otherwise fastened) via mounting points 816, such that based on a common set of mounting points the paper towel roll holder may be rotated 180 degrees for installation, such that the fixed support arm 802 extends from either the left side or the right side of the body 702 as desired (and therefore the extendible support arm 804 extends from either the right or left side as appropriate).

Figure 8D:
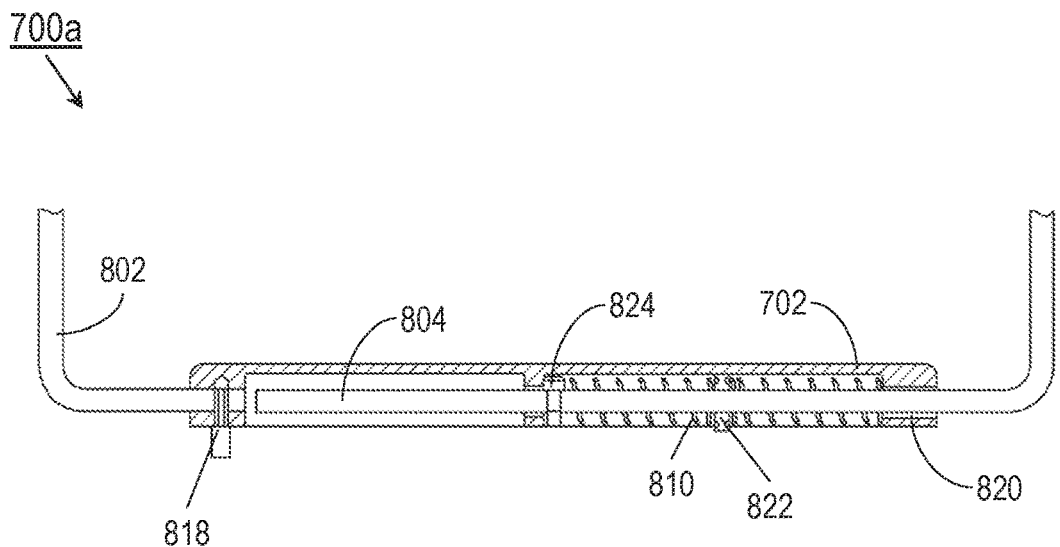
FIG. 8D is a detailed view illustrating the paper towel roll holder of FIG. 8A.

Referring in particular to FIG. 8D, the fixed support arm 802 may be held in place by a pin 818 passing through the body of the fixed support arm and into the body 702. The extendible support arm 804 may include bushing supports 820 to enhance movement of the extendible support arm toward and away from the body 702 (restrained by tension maintained by the compression springs 810 and spring actuating collar 822). The extendible support arm 804 may further be held in place by an antirotation block 824 (e.g., antirotation flat) preventing rotation of the extendible support arm 804 relative to the body 702 and the fixed support arm 802.

Figure 9A:
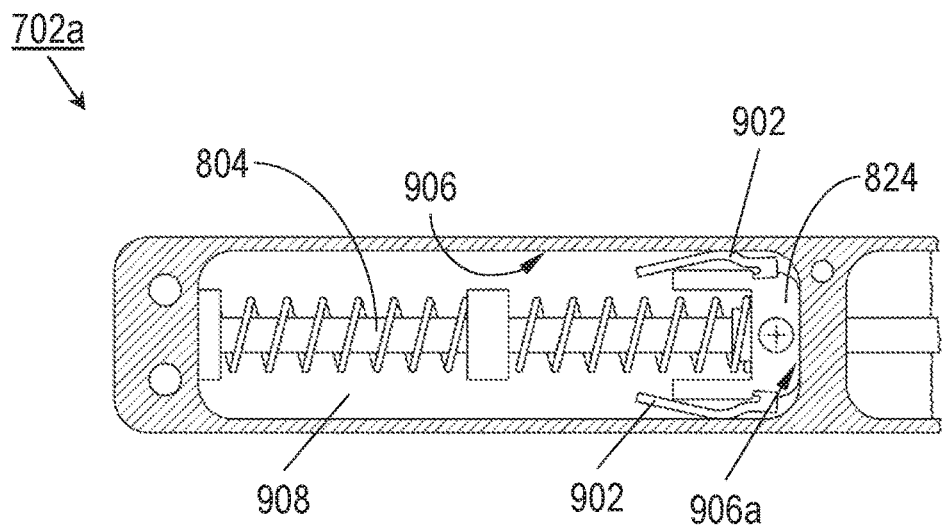
FIGS. 9A and 9B are detailed views illustrating the paper towel roll holder of FIG. 8A.
Figure 9B:
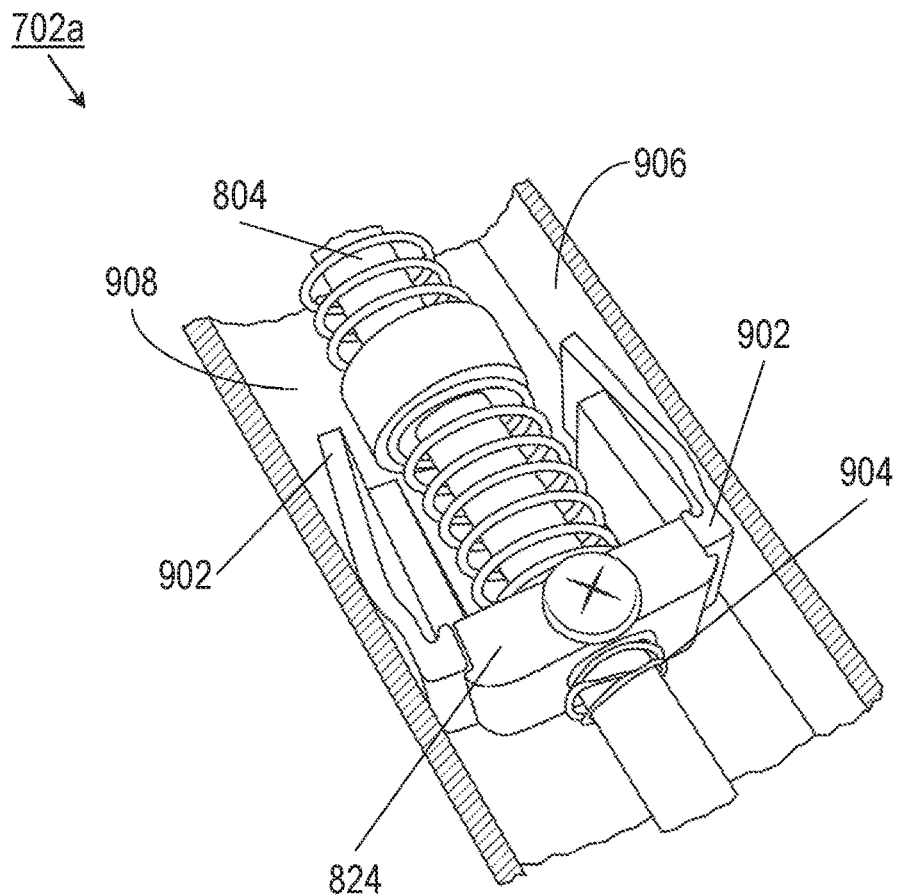

Referring to FIGS. 9A and 9B, the body 702a may be implemented and may function similarly to the body 702 of FIGS. 8A through 8D, except that the body 702a may incorporate flexible clips 902 and torsion springs 904.

In embodiments, the flexible clips 902 may be attached to the exterior of the antirotation block 824 to improve the strength and sliding function of the extendible support arm 804. For example, the flexible clips may engage with the interior surfaces 906 of the interior chamber 908 of the body 702 to provide smooth sliding of the antirotation block 824 relative to the interior surfaces, preventing the extendible support arm 804 from dropping due to wear on the antirotation block. Wear on the antirotation block may further be reduced by the torsion springs 904 situated between, and reducing the impact force between, the extensible support arm 804 and the rear interior surface 906a of the interior chamber 908.

Figure 10:
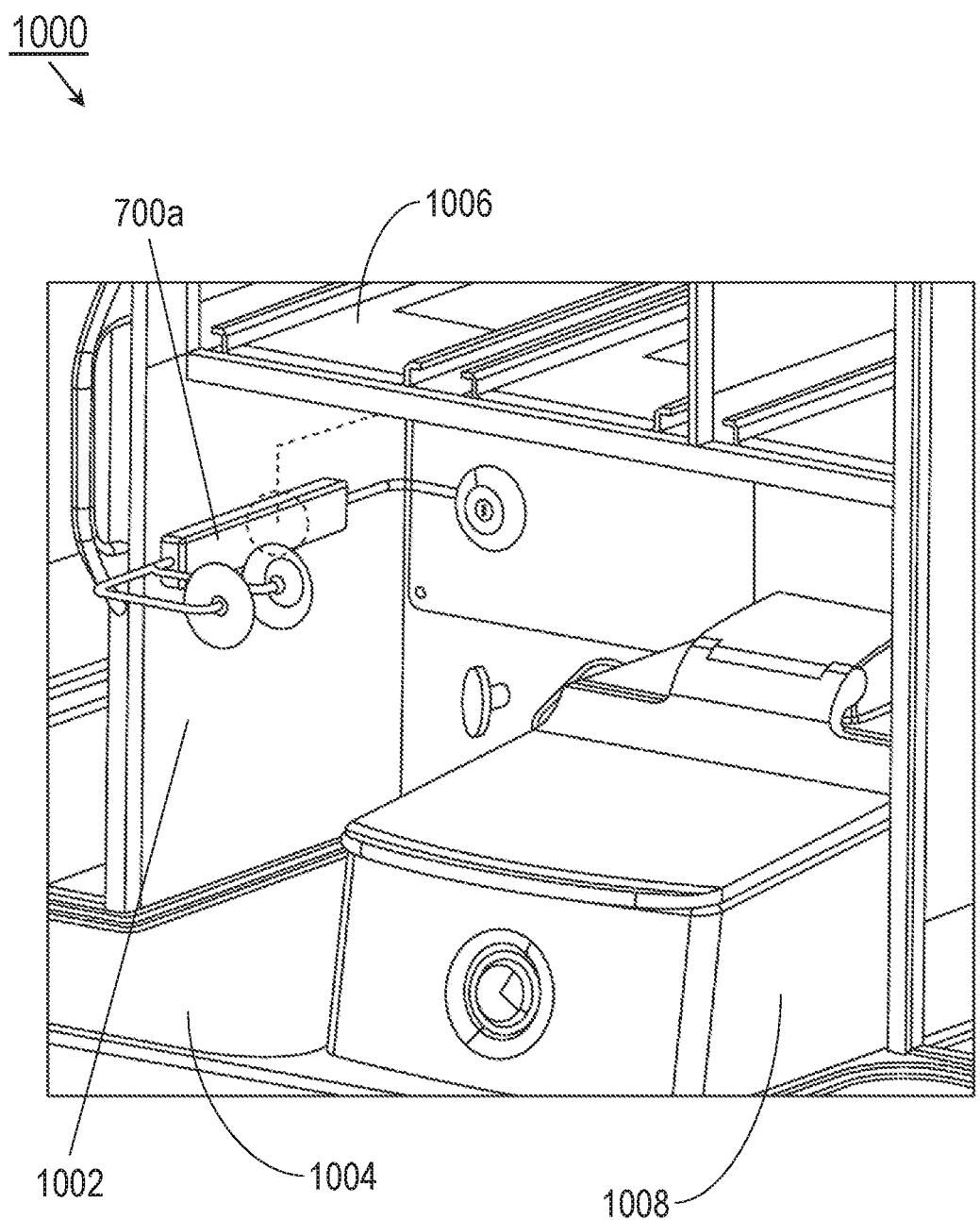
FIG. 10 is an environmental view illustrating the paper towel roll holder of FIGS. 7A and 8A.

Referring to FIG. 10, a galley environment 1000 is disclosed. In embodiments, the paper towel roll holder 700a (as well as the paper towel roll holders 100, 100a-f, 700 of FIGS. 1 through 8D) may be installed on an interior surface 1002 of the galley environment. For example, the paper towel roll holder 700a may be installed such that the extendible support arm 804 extends outward from the galley environment 1000 (e.g., or reversed so that the extendible support arm extends inward, as substantially shown by FIG. 8C).

In embodiments, the papertowel roll holder 700a may be installed for optimal utility above the galley workdeck 1004, but below the upper level of, e.g., beverage maker compartments 1006 or standard units (not shown). The paper towel roll holder 700a may be mounted proximate to a waste disposal unit 1008 of the galley environment 1000, e.g., for simplified disposal of used paper towels.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A paper towel roll holder, comprising:
a carrier section mountable to a wall of a vehicle and terminating in a first support arm extending at an angle therefrom, the first support arm including a rounded boss configured to fit into an inner sleeve of a paper towel roll
the carrier section including a plurality of detents set into at least one of a top side or a bottom side, each detent corresponding to a desired length of the paper towel roll holder;
and
a sleeve section slidably attached to the carrier section, the sleeve section terminating in a second support arm, the second support arm including a second rounded boss configured to fit into the inner sleeve opposite the first rounded boss,
the sleeve section configured to extend the length of the paper towel roll holder by sliding laterally relative to the carrier section,
wherein
the sleeve section includes at least one compressible ring regulated by a guide pin, the compressible ring configured to secure the paper towel roll holder to a plurality of desired lengths by removably locking into the plurality of detents.

2. The paper towel roll holder of claim 1, wherein:
the first support arm is hingedly attached to the carrier section;
and
the second support arm is hingedly attached to the sleeve section.

3. The paper towel roll holder of claim 1, wherein the plurality of detents are staggered between the top side and the bottom side.

4. The paper towel roll holder of claim 1, wherein the at least one guide pin is spring-loaded.

5. The paper towel roll holder of claim 1, wherein the at least one compressible ring includes a metallic compressible ring.

6. The paper towel roll holder of claim 1, wherein the at least one compressible ring includes a deformable rubber ring.

7. The paper towel roll holder of claim 1, wherein the carrier section includes at least one installation aperture configured for fitting the compressible ring to the guide pin.

* * * * *